(12) United States Patent
Ogawa et al.

(10) Patent No.: US 8,362,670 B2
(45) Date of Patent: Jan. 29, 2013

(54) STATOR AND ELECTRICAL APPARATUS

(75) Inventors: Takashi Ogawa, Osaka (JP); Yuichi Yoshikawa, Osaka (JP); Yasuo Yonei, Osaka (JP); Yasuji Echizen, Osaka (JP); Masahiko Kobayashi, Hyogo (JP)

(73) Assignee: Panasonic Corporation, Osaka (JP)

( * ) Notice: Subject to any disclaimer, the term of this patent is extended or adjusted under 35 U.S.C. 154(b) by 112 days.

(21) Appl. No.: 12/829,128

(22) Filed: Jul. 1, 2010

(65) Prior Publication Data

US 2011/0018382 A1      Jan. 27, 2011

(30) Foreign Application Priority Data

Jul. 27, 2009   (JP) ................... 2009-174510

(51) Int. Cl.
*H02K 3/34*   (2006.01)
*H02K 3/18*   (2006.01)
(52) U.S. Cl. ........................ 310/214; 310/215
(58) Field of Classification Search ........... 310/215.214, 310/216.001–216.116
See application file for complete search history.

(56) References Cited

U.S. PATENT DOCUMENTS

| | | | |
|---|---|---|---|
| 8,076,816 B2* | 12/2011 | Tsai et al. ................. | 310/194 |
| 2004/0245878 A1* | 12/2004 | Kim et al. ................. | 310/114 |
| 2009/0127969 A1* | 5/2009 | Okuyama et al. .......... | 310/215 |

FOREIGN PATENT DOCUMENTS

| | | | |
|---|---|---|---|
| JP | 2001268835 A | * | 9/2001 |
| JP | 2008-109746 | | 5/2008 |

* cited by examiner

*Primary Examiner* — Quyen Leung
*Assistant Examiner* — Leda Pham
(74) *Attorney, Agent, or Firm* — Hamre, Schumann, Mueller & Larson, P.C.

(57) ABSTRACT

A plurality of stator teeth 2 are arranged at a constant interval in a circumferential direction on the inner circumferential face side or the outer circumferential face side of a ring-shaped stator core 1 that is made of a plurality of steel plates. The winding wire 5 is wound about the stator teeth. An insulator 4 that electrically insulates the stator core and the winding wire is provided therebetween. A gap 6 is formed between the winding wire and the insulator. Accordingly, a desired distance can be secured between the stator teeth and the winding wire regardless of the thickness of the insulator, and, thus, the influence of leakage magnetic fluxes that acts on the winding wire can be reduced. Accordingly, the influence of leakage magnetic fluxes formed near the stator teeth that acts on the winding wire can be reduced regardless of the thickness of the insulator.

3 Claims, 8 Drawing Sheets

STATOR AND ELECTRICAL APPARATUS

BACKGROUND OF THE INVENTION

1. Field of the Invention

The present invention relates to a stator used in a resolver or a motor, and also relates to an electrical apparatus provided with the stator.

2. Description of the Related Art

Conventionally, this sort of stator is described in, for example, JP 2008-109746A. FIG. 6A is a front view of a conventional stator 100 described in JP 2008-109746A. The conventional stator 100 is provided with a ring-shaped stator core 101. A plurality of stator teeth (magnetic poles) 102 are arranged at a constant interval in a circumferential direction on the inner circumferential face side of the stator core 101. FIG. 6A shows the stator 100 prior to winding with a winding wire 105 (described later).

FIG. 6B is a cross-sectional view of a stator tooth 102 on a plane including line 6B-6B in FIG. 6A. As shown in FIG. 6B, the winding wire 105 is wound about each of the plurality of stator teeth 102. An insulator 104 that electrically insulates the stator core 101 and the winding wire 105 is provided between the stator core 101 and the winding wire 105. The winding wire 105 is in close contact with the outer circumferential face of the insulator 104.

As clearly seen from FIG. 6B, in the conventional stator 100, the distance between the stator tooth 102 and the winding wire 105 is determined by the thickness of the insulator 104. Accordingly, depending on the thickness of the insulator 104, leakage magnetic fluxes formed near the stator tooth 102 act on the winding wire 105. For example, in the case where the stator 100 is used in a resolver, error components generated by these leakage magnetic fluxes are superimposed on an induced voltage generated at the winding wire 105, which leads to the problem of the precision in detecting an angle being lowered.

SUMMARY OF THE INVENTION

The present invention was made in order to solve the above-described problem of conventional stators, and it is an object thereof to reduce the influence of leakage magnetic fluxes that acts on a winding wire regardless of the thickness of an insulator.

The present invention is directed to a stator, including: a ring-shaped stator core on whose inner circumferential face side or outer circumferential face side a plurality of stator teeth are arranged at a constant interval in a circumferential direction, and that is made of a plurality of steel plates; a winding wire that is wound about the plurality of stator teeth; and an insulator that is interposed between and electrically insulates the stator core and the winding wire; wherein a gap is formed between the winding wire and the insulator.

The present invention is directed to an electrical apparatus, including the stator according to the present invention.

DESCRIPTION OF THE PREFERRED EMBODIMENTS

According to the present invention, a gap is formed between the winding wire and the insulator, and, thus, a desired distance can be secured between the stator teeth and the winding wire regardless of the thickness of the insulator. Accordingly, it is possible to arrange the winding wire so as to be spaced apart from leakage magnetic fluxes formed near the stator teeth, and, thus, it is possible to reduce the influence of leakage magnetic fluxes acting on the winding wire.

In the stator of the present invention, it is preferable that, in a cross-sectional view of the stator teeth on a plane perpendicular to a straight line along a radial direction of the stator core, the winding wire is curved substantially in a shape of an arc at a coil end portion of the winding wire, and a gap is formed between the winding wire and the insulator. Accordingly, it is possible to arrange the winding wire so as to be spaced apart from the stator teeth on the coil end portion side where the amount of leakage magnetic fluxes is relatively large, while suppressing an increase in the size of the wound winding wire on the side face side of the stator teeth. Accordingly, it is possible to reduce the influence of leakage magnetic fluxes on the coil end portion side that acts on the winding wire, without substantially lowering the ratio of area occupied by the winding wire between stator teeth adjacent to each other in the circumferential direction (also referred to as a space factor).

It is preferable that a gap on a coil end portion side of the stator teeth is larger than a gap on a side face side thereof. Accordingly, it is possible to arrange the winding wire so as to be spaced apart from the stator teeth on the coil end portion side where the amount of leakage magnetic fluxes is relatively large, while suppressing an increase in the size of the wound winding wire on the side face side of the stator teeth. Accordingly, it is possible to reduce the influence of leakage magnetic fluxes on the coil end portion side that acts on the winding wire, without substantially lowering the ratio of area occupied by the winding wire between stator teeth adjacent to each other in the circumferential direction.

Hereinafter, a stator of the present invention will be described in detail using preferred embodiments.

EMBODIMENT 1

Figure 1A:
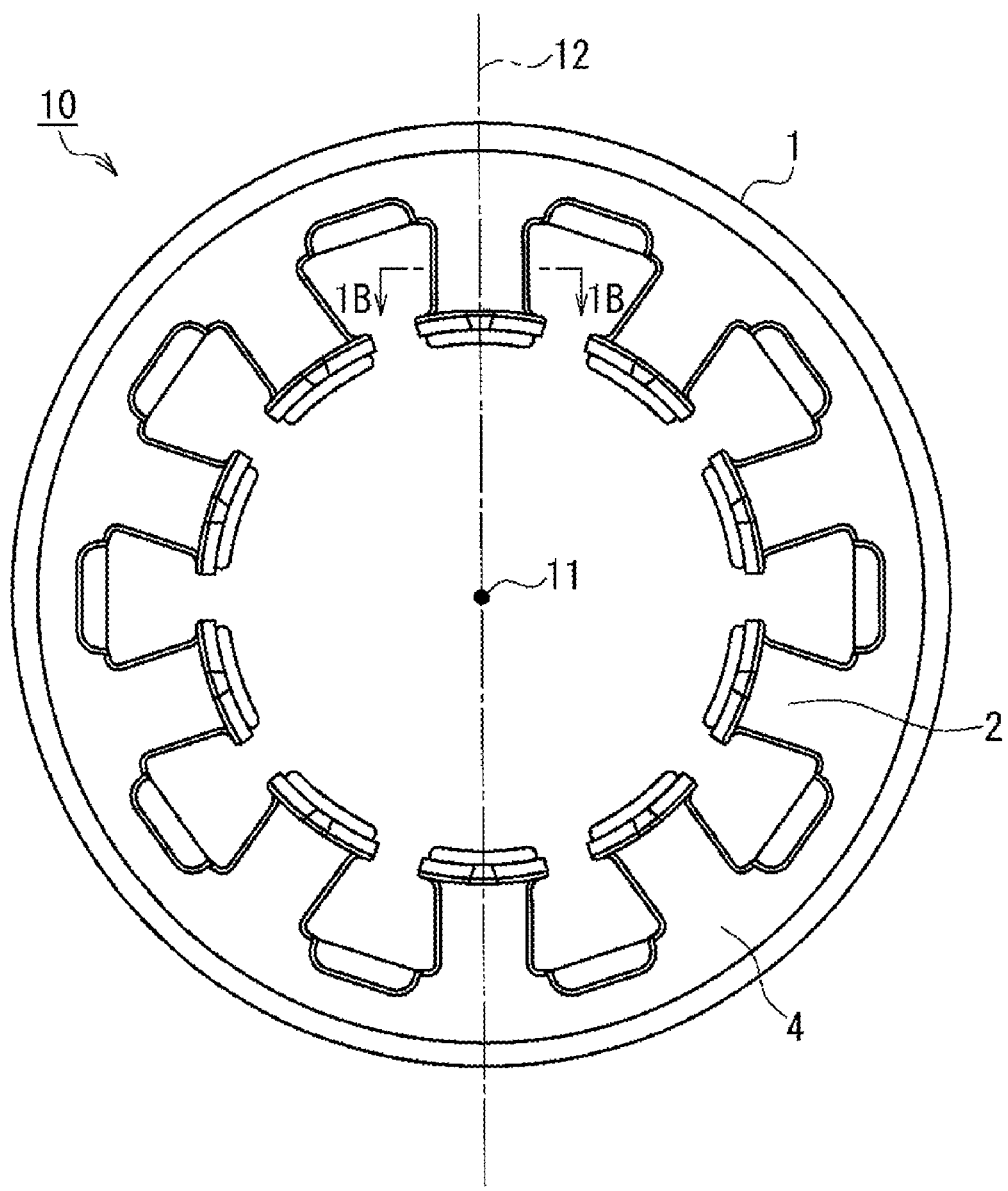
FIG. 1A is a front view of a stator according to Embodiment 1 of the present invention.

FIG. 1A is a front view of a stator 10 according to Embodiment 1 of the present invention. The stator 10 is provided with a ring-shaped stator core 1. Here, 11 denotes a central axis of the stator core 1 that extends perpendicularly to a section of the diagram of FIG. 1A, and matches a center of a rotational shaft of a motor on which the stator 10 is mounted. The stator core 1 is made of a plurality of steel plates that are layered in the direction of the central axis 11. A plurality of stator teeth (magnetic poles) 2 are arranged at a constant interval in a circumferential direction on the inner circumferential face side of the stator core 1. FIG. 1A shows the stator 10 prior to winding with a winding wire 5 (described later). In FIG. 1A, the stator core 1 is covered by an insulator 4 (described later in detail), and cannot be seen.

Figure 1B:
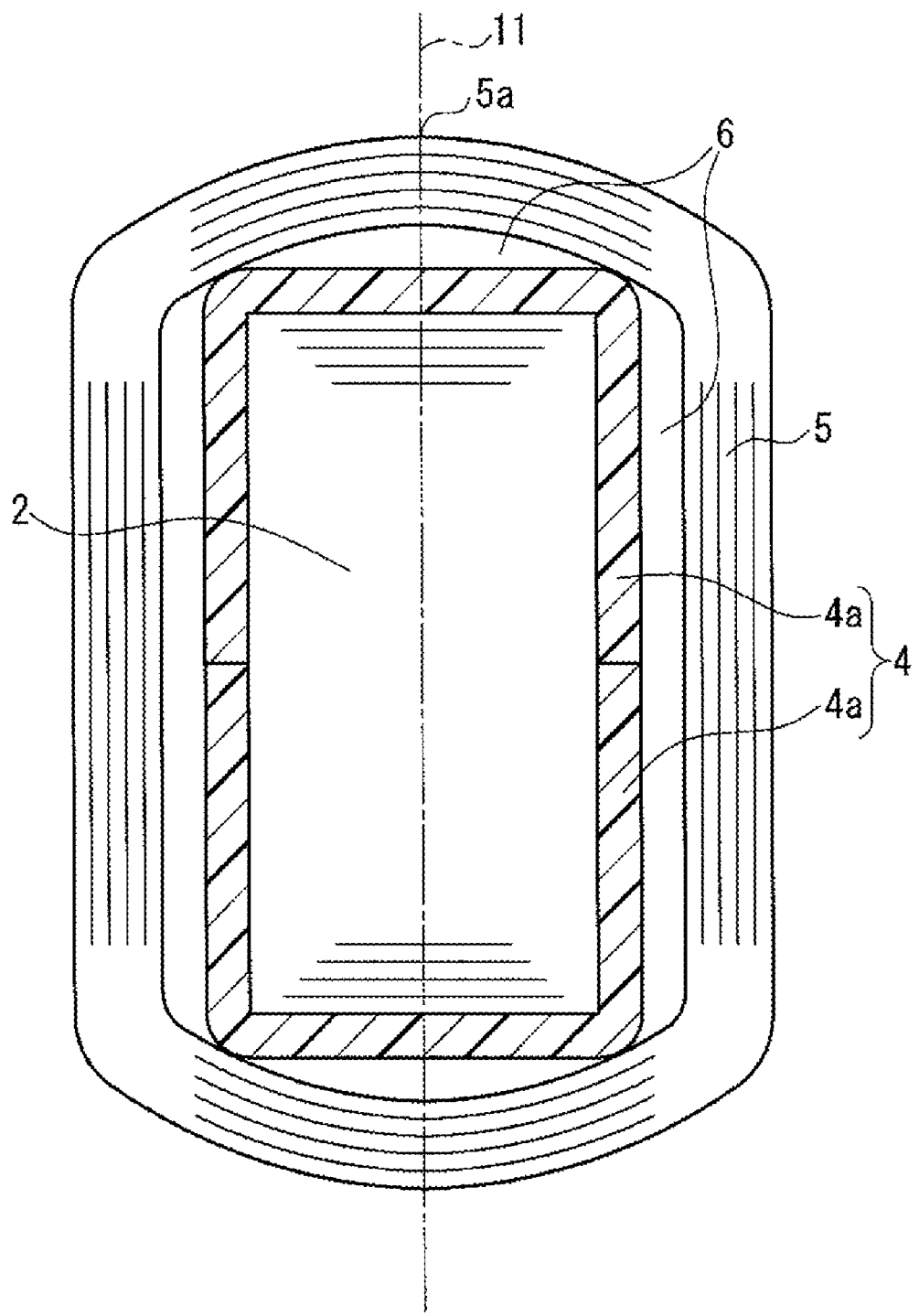
FIG. 1B is a cross-sectional view of a stator tooth of the stator according to Embodiment 1 of the present invention on a plane including line 1B-1B in FIG. 1A.
Figure 2A:
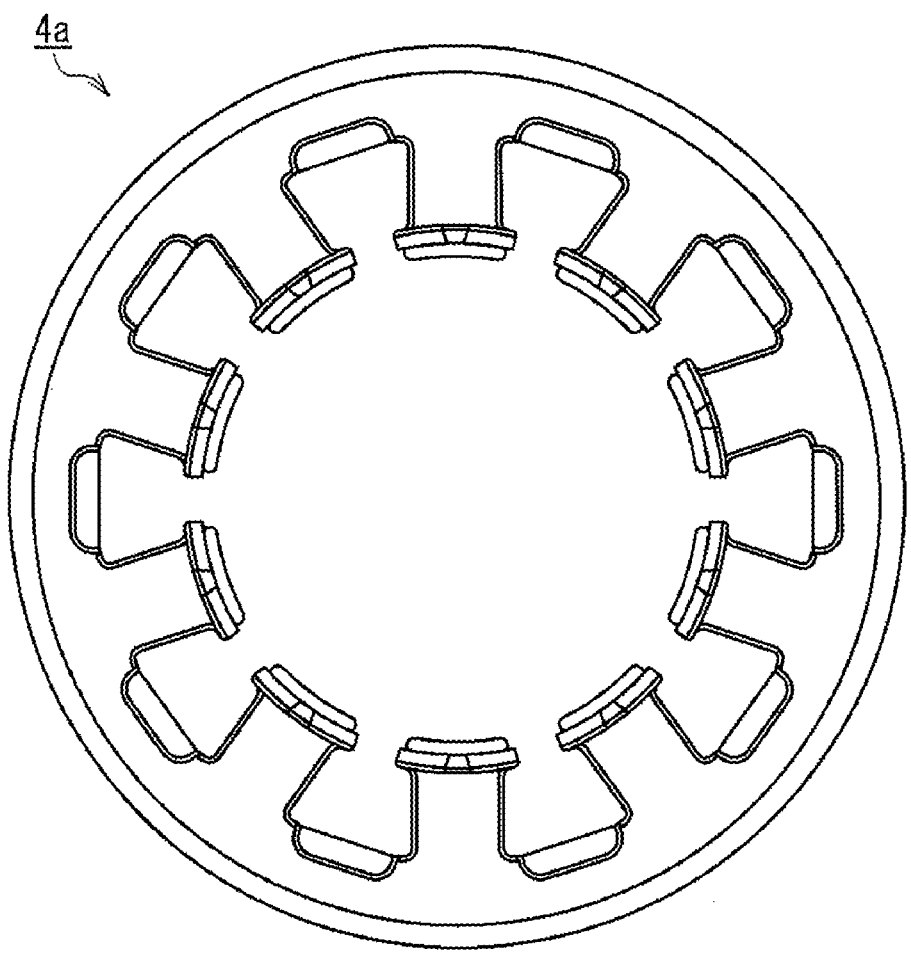
FIG. 2A is a front view of an insulator half portion used in the stator according to Embodiment 1 of the present invention.
Figure 2B:
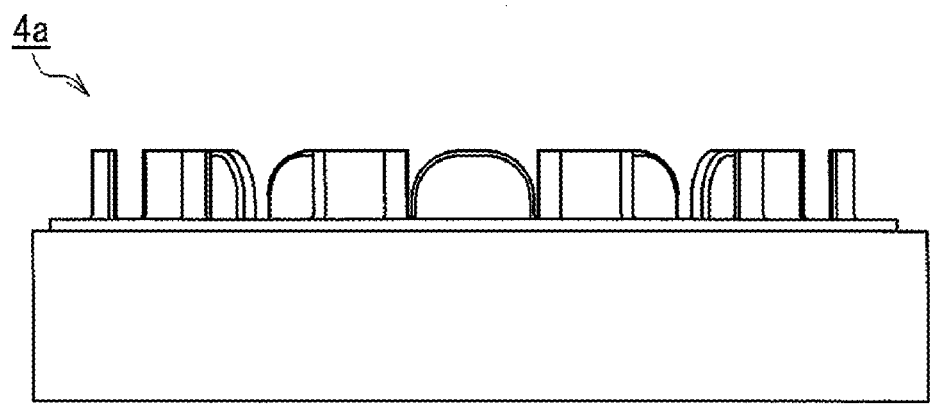
FIG. 2B is a side view thereof.

FIG. 1B is a cross-sectional view of a stator tooth 2 on a plane including line 1B-1B in FIG. 1A, and perpendicular to a dashed dotted line 12 along the radial direction of the stator core 1 (i.e., orthogonal to the central axis 11 of the stator core 1). Here, the dashed dotted line 12 passes through the center of the stator teeth 2 (magnetic pole center). The winding wire 5 is wound about each of the plurality of stator teeth 2. At coil end portions 5a, which are end portions of the winding wire 5 in the direction of the central axis 11 (the vertical direction in FIG. 1B), the winding wire 5 is curved substantially in the shape of an arc so as to project outward. The insulator 4 that electrically insulates the stator core 1 and the winding wire 5 is provided between the stator core 1 and the winding wire 5. The insulator 4 is configured from a pair of insulator half portions 4a that are divided in the direction of the central axis 11. FIG. 2A is a front view of an insulator half portion 4a, and FIG. 2B is a side view thereof. The pair of insulator half portions 4a are attached to the stator core 1 so as to sandwich the stator core 1 in the direction of the central axis 11.

As shown in FIG. 1B, in Embodiment 1, gaps 6 are formed between the winding wire 5 and the insulator 4. More specifically, the gaps 6 are formed respectively on the coil end portions 5a side, and on the side faces side of the stator tooth 2 (faces opposing stator teeth 2 adjacent thereto in the circumferential direction of the stator core 1). The winding wire 5 is in contact with and supported by four corners of the substantially rectangular cross-section of the insulator 4.

In this manner, in the stator 10 according to Embodiment 1, the gaps 6 are formed between the winding wire 5 and the insulator 4 and, thus, the winding wire 5 can be spaced apart by a desired distance from the stator tooth 2 regardless of the thickness or the shape of the insulator 4. Accordingly, the influence of leakage magnetic fluxes formed near the stator tooth 2 acting on the winding wire 5 can be reduced. Accordingly, for example, in the case where the stator 10 is used in a resolver, an induced voltage generated by these leakage magnetic fluxes and acting as error components is reduced, and, thus, the precision in detecting an angle can be improved.

Next, results obtained by performing investigations in order to confirm the effect of Embodiment 1 will be described.

Figure 3:
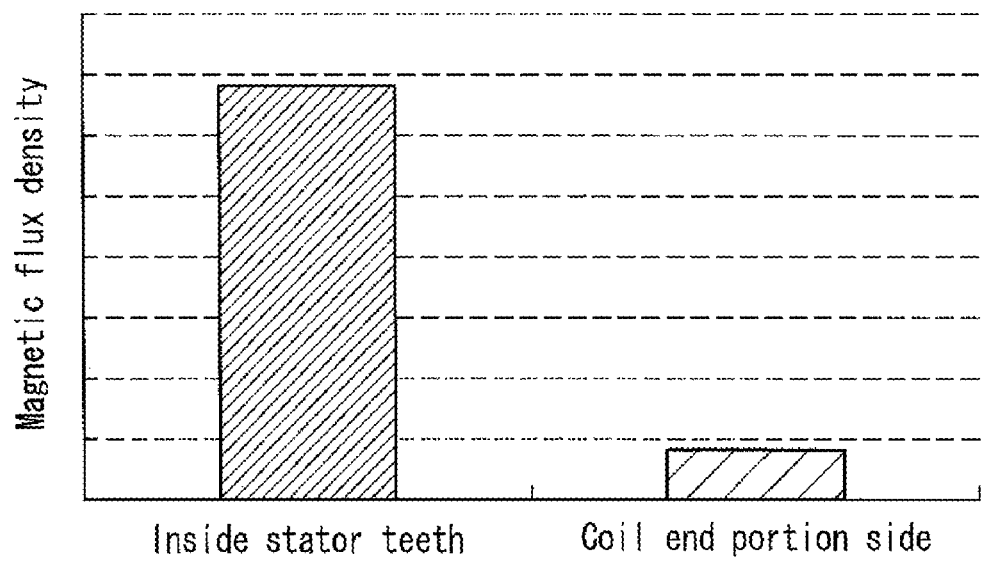
FIG. 3 is a graph showing a comparison between the magnetic flux density of magnetic fluxes linked to a stator tooth, and the magnetic flux density of leakage magnetic fluxes formed on the stator tooth on a coil end portion side, in the stator according to Embodiment 1 of the present invention.

First, the relationship between the magnetic flux density of magnetic fluxes linked to the stator tooth 2 and the magnetic flux density of leakage magnetic fluxes on the coil end portion 5a side of the stator tooth 2 was obtained. The magnetic flux density of magnetic fluxes linked to the stator tooth 2 was calculated by performing a magnetic field analysis on an average value of the density of magnetic fluxes linked to the stator tooth 2 in an AC excitation, using a two-dimensional finite element method. The magnetic flux density of leakage magnetic fluxes on the coil end portion 5a side of the stator tooth 2 was obtained by inserting a probe end of a fluxmeter from the inner circumferential side of the winding wire 5 into the gap 6 on the coil end portion 5a side, and measuring the magnetic flux density under a DC excitation. Here, it is assumed that the effective value of the AC excitation and the DC excitation are the same. FIG. 3 shows the result. It is seen that 13% of the magnetic fluxes linked to the stator tooth 2 calculated using the magnetic field analysis actually formed leakage magnetic fluxes on the coil end portion 5a side of the stator tooth 2.

Figure 4:
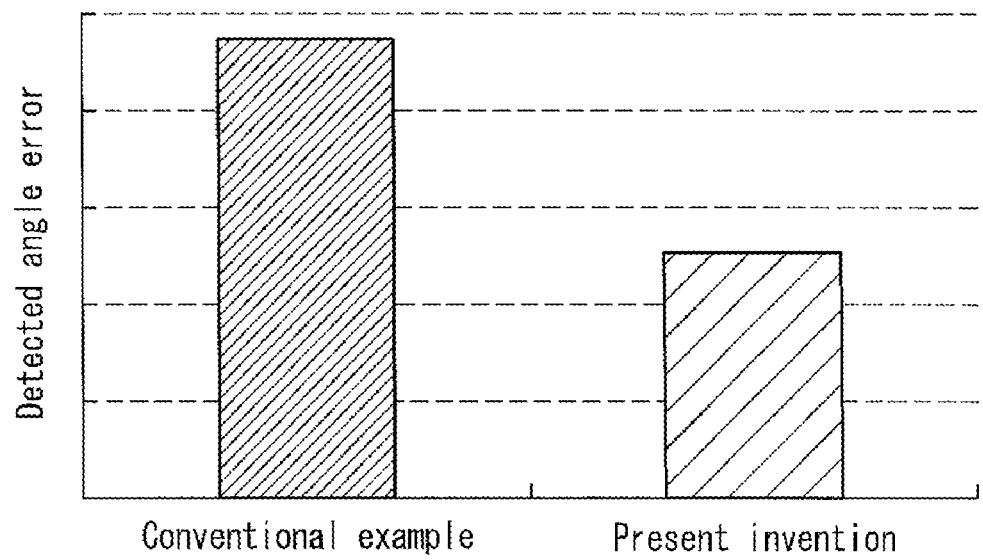
FIG. 4 is a graph showing a result obtained by measuring errors in an angle detection as a resolver of the stator according to Embodiment 1 of the present invention and a conventional stator.

Next, the precision in detecting an angle in the case where the stator 10 was used in a resolver was measured. The measuring method was as follows. The stator 10 was mounted on the rotational shaft of the motor; and the rotational angle of the rotational shaft was detected based on an induced voltage generated at the winding wire 5. The detected rotational angle was compared with a rotational angle detected by an encoder mounted on the same rotational shaft, and the largest value of the difference therebetween was obtained as a detected angle error. For the sake of comparison, a detected angle error was measured in a similar manner using a conventional stator that was the same as the above-described stator except that no gap 6 was formed between the winding wire 5 and the insulator 4. FIG. 4 shows the result. It was seen that the present invention has a better precision in detecting an angle without changing the shape of the stator core 1 than the conventional example in which no gap 6 is formed between the winding wire 5 and the insulator 4.

EMBODIMENT 2

Figure 5A:
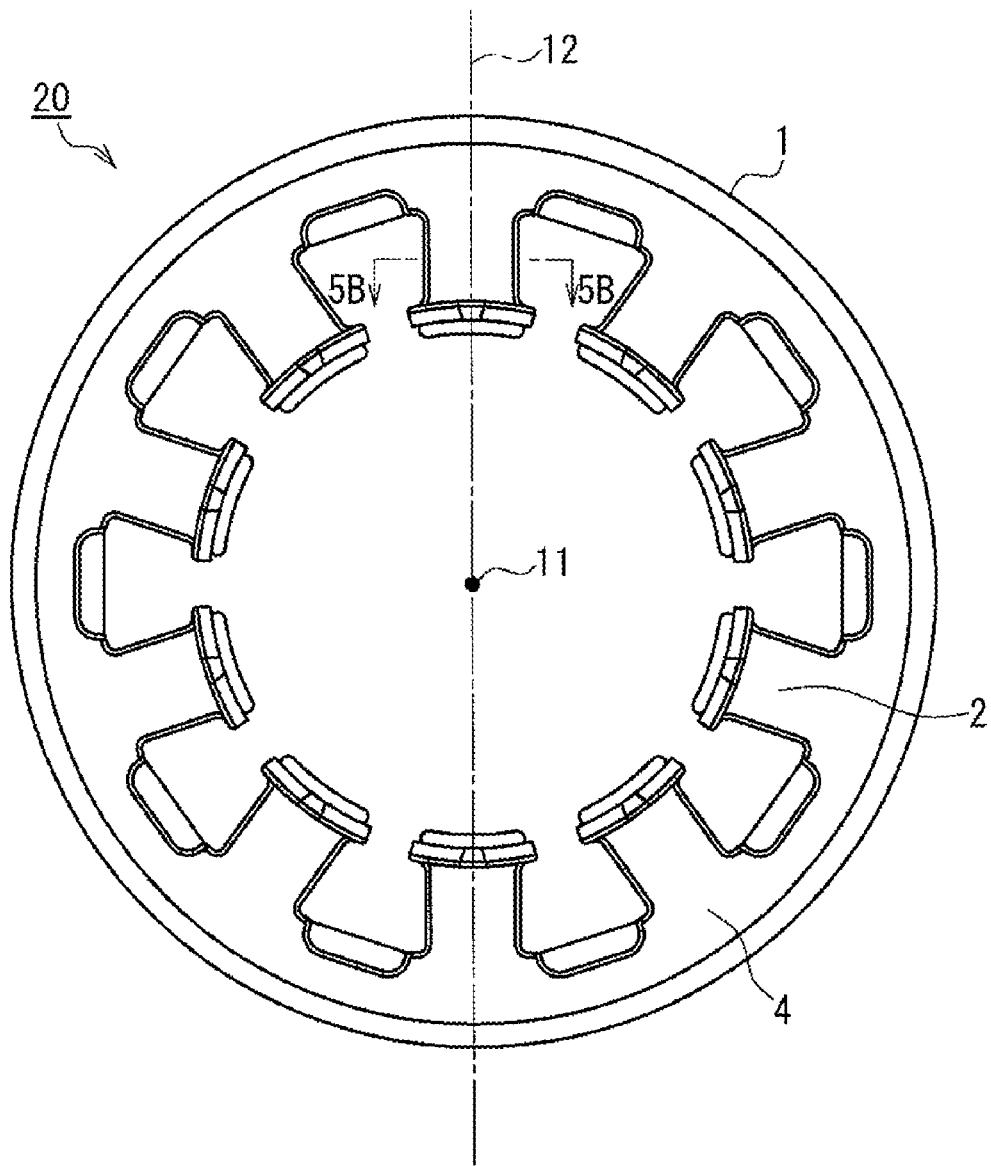
FIG. 5A is a front view of a stator according to Embodiment 2 of the present invention.
Figure 5B:
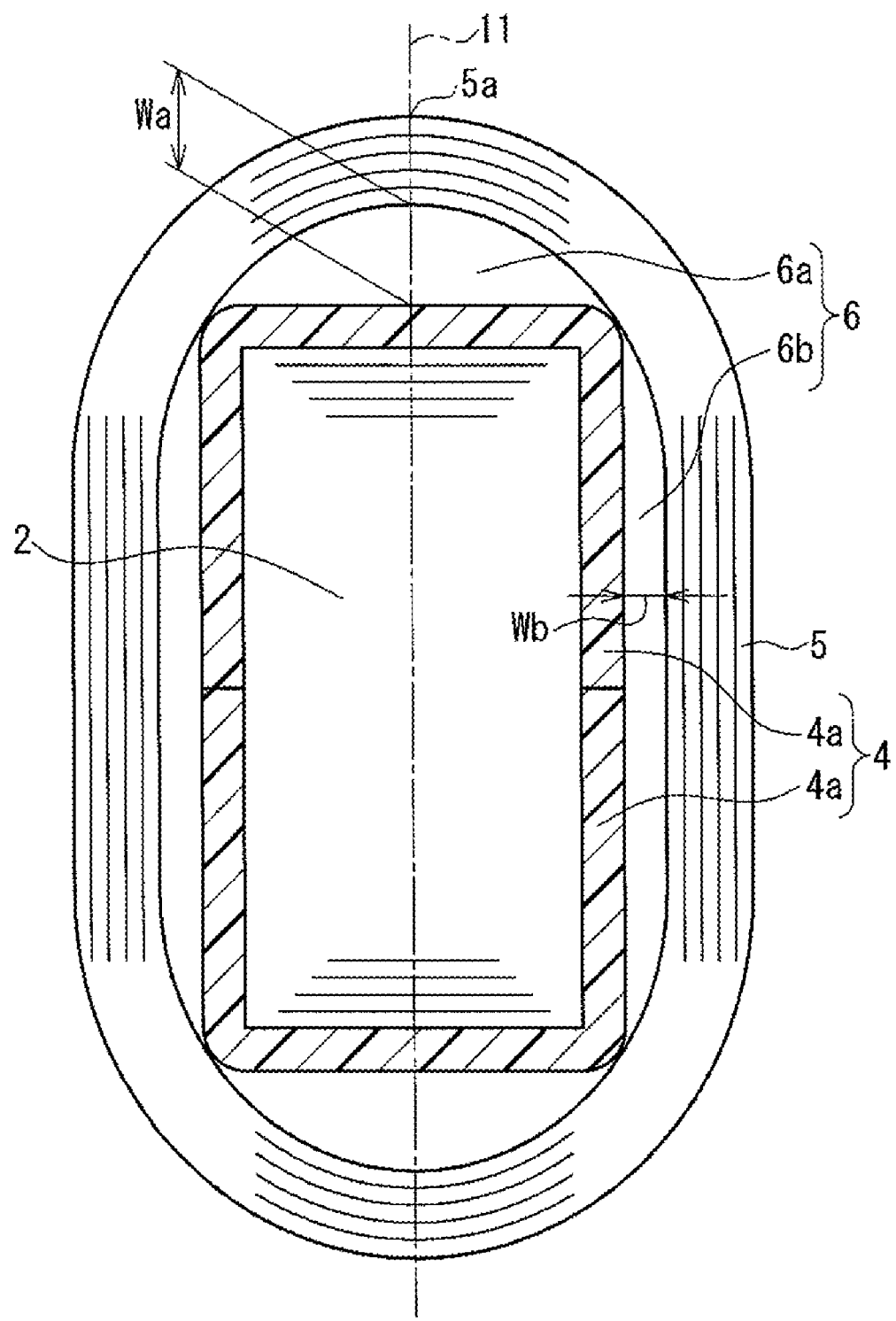
FIG. 5B is a cross-sectional view of a stator tooth of the stator according to Embodiment 2 of the present invention on a plane including line 5B-5B in FIG. 5A.
Figure 6A:
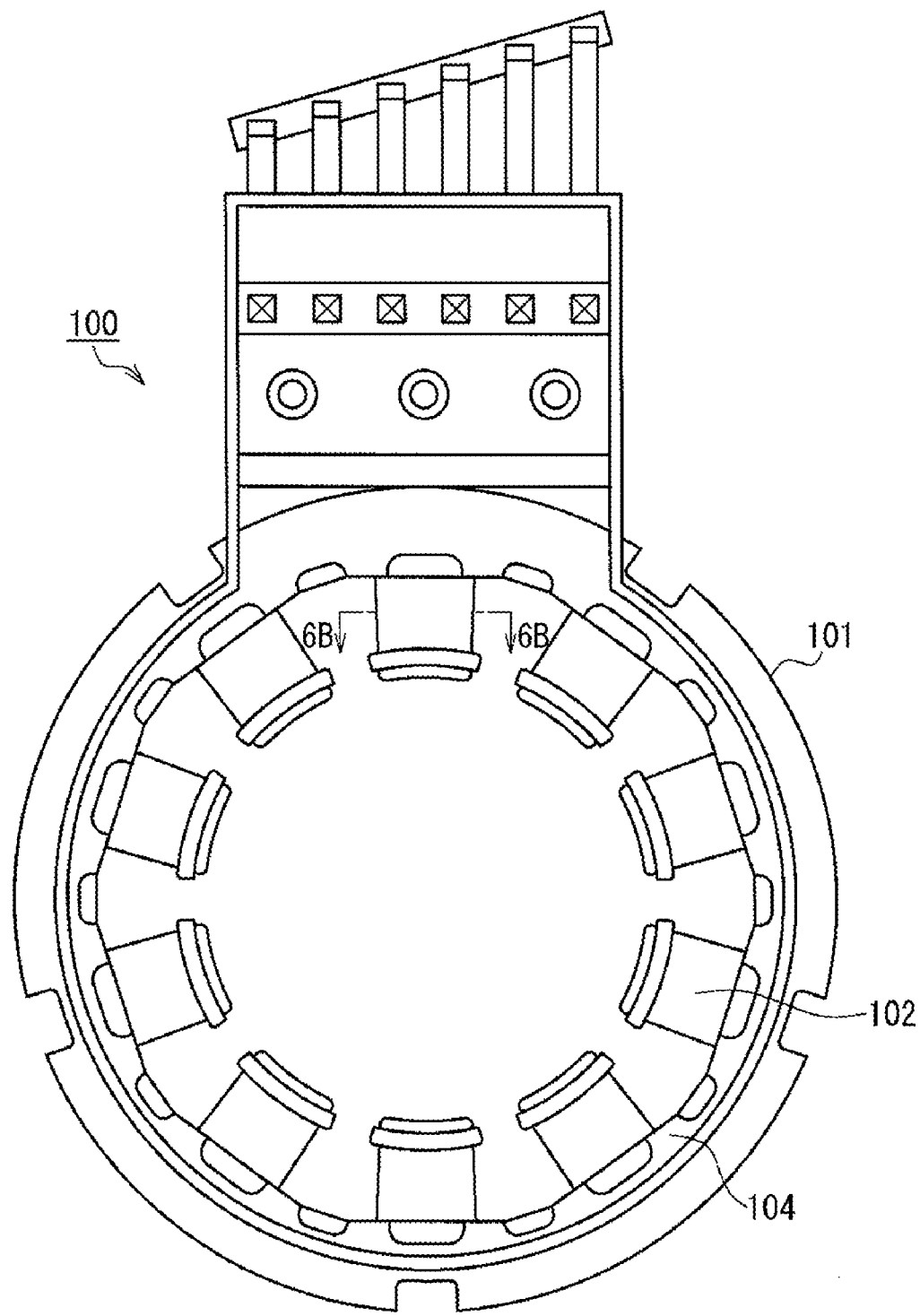
FIG. 6A is a front view of a conventional stator.
Figure 6B:
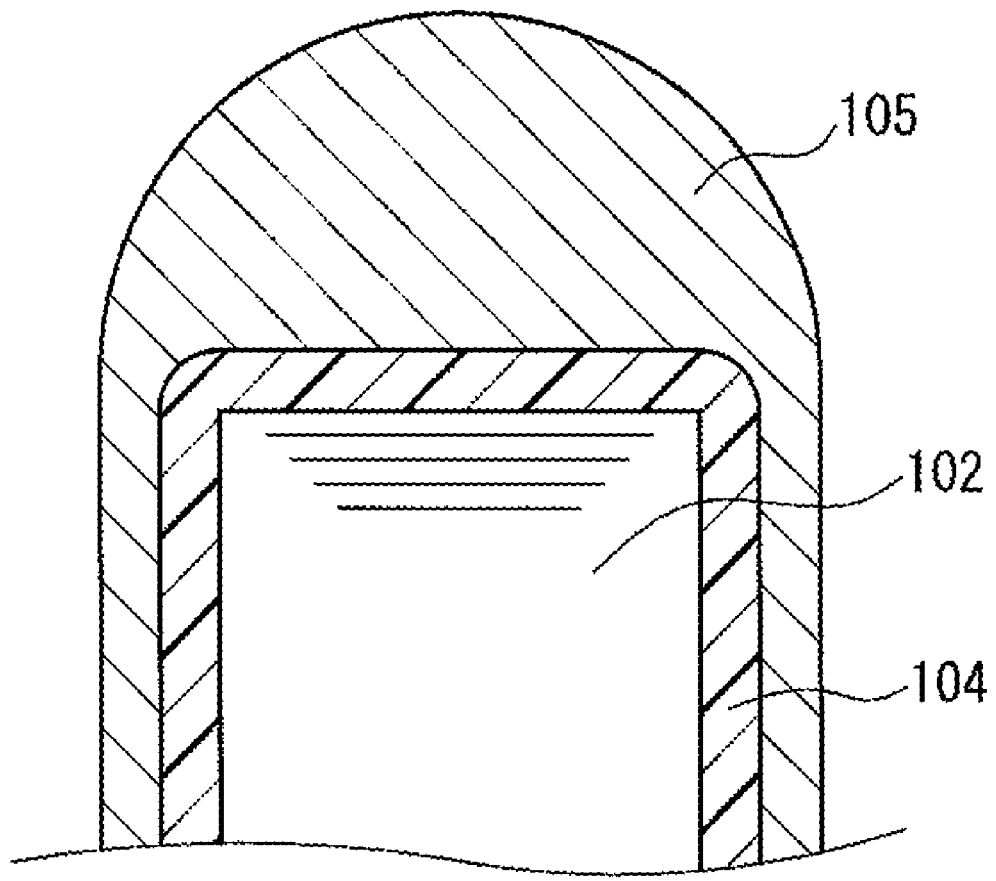
FIG. 6B is a cross-sectional view of a stator tooth of the conventional stator on a plane including line 6B-6B in FIG. 6A.

FIG. 5A is a front view of a stator 20 according to Embodiment 2 of the present invention. FIG. 5B is a cross-sectional view of the stator tooth 2 on a plane including line 5B-5B in FIG. 5A, and perpendicular to a dashed dotted line 12 along the radial direction of the stator core 1. In FIGS. 5A and 5B, the same constituent elements as those in FIGS. 1A and 1B showing the stator 10 of Embodiment 1 are denoted by the same numerals, and their further description is omitted. Hereinafter, Embodiment 2 will be described focusing on aspects different from those in Embodiment 1.

As shown in FIG. 5B, in Embodiment 2, when the largest size in the direction of the central axis 11 of gaps 6a formed between the winding wire 5 and the insulator 4 on the coil end portions 5a side of the stator tooth 2 is taken as Wa, and the largest size in the circumferential direction (the horizontal direction in FIG. 5B) of gaps 6b formed between the winding wire 5 and the insulator 4 on the side faces side of the stator tooth 2 is taken as Wb, Wa>Wb is satisfied. Embodiment 2 is the same as Embodiment 1 in that the winding wire 5 forming the coil end portions 5a is curved substantially in the shape of an arc, and also in that the winding wire 5 is in contact with and supported by four corners of the substantially rectangular cross-section of the insulator 4.

Ordinarily, the amount of leakage magnetic fluxes formed near the stator tooth 2 is larger on the coil end portions 5a side than on the side faces side of the stator tooth 2. Accordingly, in the case where larger gaps 6a are formed on the coil end portions 5a side, the influence of leakage magnetic fluxes that acts on the winding wire 5 can be reduced effectively.

Meanwhile, in the case where the size of the gaps 6b on the side faces side of the stator tooth 2, where the amount of leakage magnetic fluxes is relatively small, is reduced, an increase in the size in the circumferential direction of the winding wire 5 that is wound about the stator tooth 2 (i.e., an increase in the size in the circumferential direction of the wound winding wire 5) can be avoided, and, thus, the ratio of area occupied by the winding wire 5 between stator teeth 2 adjacent to each other in the circumferential direction is not substantially lowered compared with that of conventional examples.

Embodiments 1 and 2 described above are merely illustrative. The present invention is not limited to these, and various changes are possible as appropriate.

For example, although the stators 10 and 20 of Embodiments 1 and 2 are of an inner rotor-type in which the plurality of stator teeth 2 are provided on the inner circumferential face side of the stator core 1, the stator of the present invention is not limited to this, and may be of an outer rotor-type in which a plurality of stator teeth are provided on an outer circumferential face side of the stator core.

Although the winding wire 5 is wound about the stator teeth 2 only in a single phase in Embodiments 1 and 2, the present invention is not limited to this, and the winding wire may be wound in a plurality of phases.

Although the gaps 6 are formed on both of the coil end portions 5*a* side of the stator teeth 2 and on the side faces side of the stator teeth 2 in Embodiments 1 and 2, the gaps may be formed on only one side. In particular, a gap does not have to be substantially formed between the winding wire 5 and the insulator 4 on the side faces side of the stator teeth 2 where the amount of leakage magnetic fluxes is relatively small.

The number of the stator teeth 2 provided on the stator core 1 is not limited to 10, which is shown in Embodiments 1 and 2, and may be larger than or smaller than 10.

According to the present invention, it is possible to provide a stator in which the influence of leakage magnetic fluxes formed near stator teeth that acts on a winding wire is reduced. Accordingly, the stator of the present invention can be mounted on various electrical apparatuses, for example, as an angle detector. For example, the stator of the present invention can be used in a resolver that detects the rotational angle of a rotational shaft of a motor.

The embodiments described above are intended solely to elucidate the technological content of the present invention, and the present invention is not limited to or by these specific examples alone. Various modifications are possible within the spirit of the invention and the scope of the claims, and the present invention should be interpreted broadly.

What is claimed is:

1. A stator, comprising:
    a ring-shaped stator core on whose inner circumferential face side or outer circumferential face side a plurality of stator teeth are arranged at a constant interval in a circumferential direction, and that is made of a plurality of steel plates;
    a winding wire that is wound about the plurality of stator teeth; and
    an insulator that is interposed between and electrically insulates the stator core and the winding wire;
    wherein the insulator covers an entire periphery of the stator teeth, a gap is formed between the winding wire and the insulator; and
    a gap between the winding wire and the insulator on a coil end portion side of the stator teeth is larger than a gap between the winding wire and the insulator on a side face side of the stator teeth.

2. The stator according to claim 1, wherein, in a cross-sectional view of the stator teeth on a plane perpendicular to a straight line along a radial direction of the stator core, the winding wire is curved substantially in a shape of an arc at a coil end portion of the winding wire, and a gap is formed between the winding wire and the insulator.

3. An electrical apparatus, comprising the stator according to claim 1.

* * * * *